United States Patent [19]

Siegenthaler

[11] Patent Number: 5,384,084
[45] Date of Patent: Jan. 24, 1995

[54] ROAD VEHICLE TIRE MANUFACTURING METHOD

[75] Inventor: Karl J. Siegenthaler, Roma-Ostia, Italy

[73] Assignee: Bridgestone Corporation, Tokyo, Japan

[21] Appl. No.: 81,046

[22] Filed: Jun. 22, 1993

[30] Foreign Application Priority Data

Jul. 1, 1992 [IT] Italy .................. TO92A 000554

[51] Int. Cl.⁶ .................. B29B 13/02; B29C 35/02
[52] U.S. Cl. .................. 264/237; 264/502; 264/326; 264/DIG. 46; 264/DIG. 65; 425/40; 425/58.1; 425/DIG. 39
[58] Field of Search ....... 264/502, 315, 326, DIG. 46, 264/DIG. 65, DIG. 74, 236, 237; 425/38, 40, 58.1, DIG. 13, DIG. 39, 41

[56] References Cited

U.S. PATENT DOCUMENTS

| | | | |
|---|---|---|---|
| 1,566,500 | 12/1925 | Northrup | 264/326 |
| 3,783,241 | 1/1974 | Cimprich | 425/38 |
| 3,956,443 | 5/1976 | Shichman | 264/502 |
| 4,221,253 | 9/1980 | Seiberling | 152/330 |
| 4,525,320 | 6/1985 | Sarumaru | 264/315 |
| 4,653,992 | 3/1987 | Baraldi | 425/40 |
| 4,699,578 | 10/1987 | Sumner et al. | 264/315 |
| 4,816,198 | 3/1989 | Mattson | 264/40.6 |
| 5,204,049 | 4/1993 | Siegenthaler | 264/DIG. 65 |

FOREIGN PATENT DOCUMENTS

| | | | |
|---|---|---|---|
| 0488636 | 6/1992 | European Pat. Off. | |
| 2203030 | 7/1973 | Germany | 264/315 |
| 1952439 | 5/1978 | Germany | |

Primary Examiner—Mathieu D. Vargot
Attorney, Agent, or Firm—David A. Thomas

[57] ABSTRACT

A method of manufacturing road vehicle tires, whereby a toroidal forming mold, housing a finished green tire, is fed successively through a first preheating station where peripheral heating elements preheat the tread portion of the green tire; through a second curing station where the tire is cured; and through a third postinflation station where the tire, fitted to a tubular support and removed from the mold, is engaged by a cooling element for cooling the bead portions of the tire.

6 Claims, 2 Drawing Sheets

ROAD VEHICLE TIRE MANUFACTURING METHOD

BACKGROUND OF THE INVENTION

1. Technical Field

The present invention relates to a road vehicle tire manufacturing method.

2. Background Information

U.S. patent application Ser. No. 07/966,977, filed Oct. 27, 1992, now U.S. Pat. 5,304,270, entitled Tire Manufacturing Process, to which full reference is made herein in the interest of full disclosure, relates to a road vehicle tire manufacturing process whereby a green tire is assembled inside an annular forming mold having a toroidal inner chamber negatively reproducing the surface of the finished tire.

According to the above patent application, the forming mold is fitted and gripped between two opposite portions of a curing unit having a curing bladder, which is inserted inside the tire and mold, and defines part of a heat exchange gas circuit. At the end of the curing stage, the curing unit is opened, the bladder removed from the tire, and the tire unloaded off the curing unit together with the forming mold inside in which the tire is housed pending completion of the postinflation stage.

The above known process presents several drawbacks normally due to the long curing and postinflation times involved, and the difficulty encountered during curing, in controlling the temperature of the various parts of the tire for preventing local burning and/or overcuring and/or undercuring.

An important point to note in connection with the above is that the mass of the tire is mainly centered about the bead and tread portions, which thus require a relatively long curing time, whereas the sidewalls tend, not only to cure faster, but also to overcure or burn as a result of the heat yielded by the metal beads after curing.

SUMMARY OF THE INVENTION

It is an object of the present invention to provide a method enabling a reduction in curing time and, consequently, in energy consumption, and which at the same time provides for improving in-curing heat distribution within the tire.

It is a further object of the present invention to prevent local overcuring caused by excessive heat exchange, after curing, between adjacent parts of the tire.

According to the present invention, there is provided a road vehicle tire manufacturing method, characterized by the fact that it comprises stages consisting in successively feeding a toroidal forming mold, housing a finished green tire, through a first preheating station wherein first heating means are connected to the forming mold for preheating given portions of the green tire; through a second curing station wherein the mold is connected to a curing unit pending completion of the curing process; and through a third postinflation station wherein the tire is engaged by means for cooling given portions of the tire.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 2:
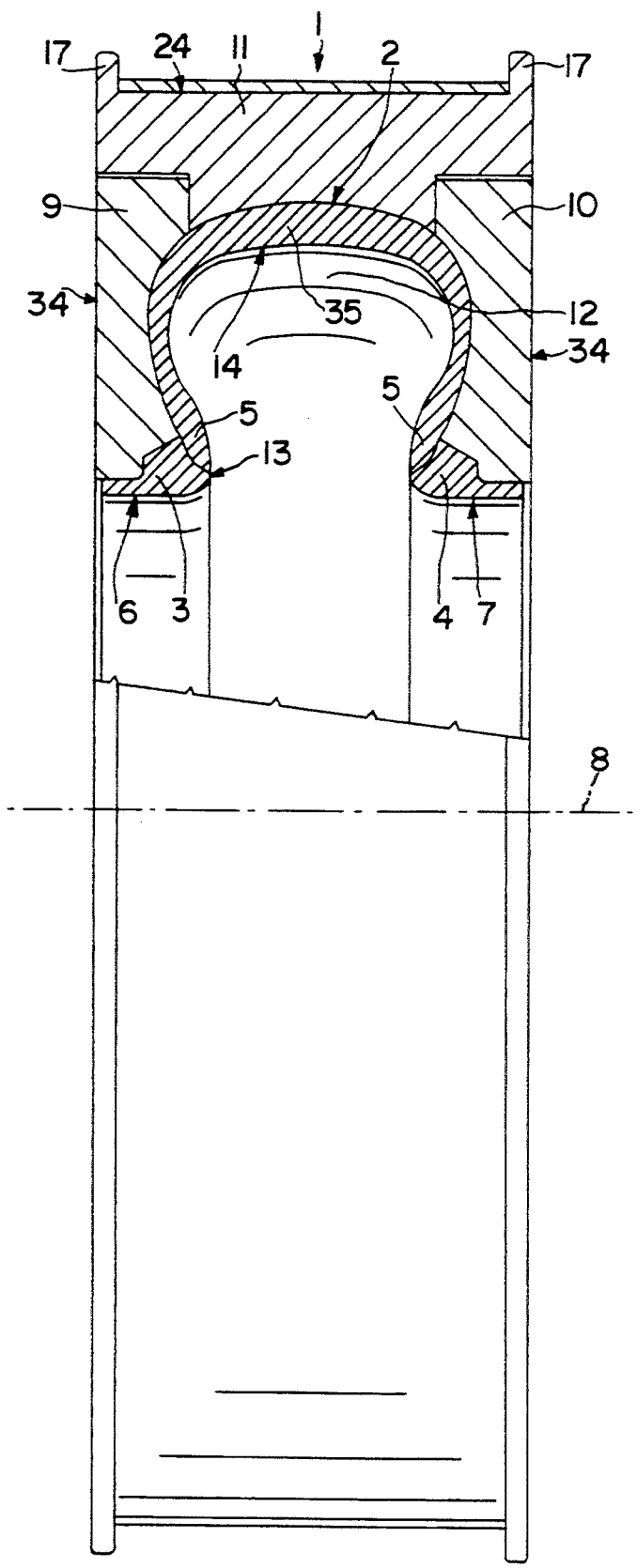
FIG. 2 shows an axial section of a forming mold employed in the FIG. 1 method.

Number 1 in FIG. 2 indicates a mold for forming a tire 2, and comprises a first and second inner annular support 3 and 4 for respective bead portions 5 of tire 2. Annular supports 3 and 4 are defined internally by respective cylindrical surfaces 6 and 7 coaxial with axis 8, and are connected releasably to the inner edge of respective annular plates 9 and 10, the outer edges of which are connected releasably to respective axial ends of an outer annular body 11. Together with annular plates 9 and 10 and annular supports 3 and 4, annular body 11 defines a toroidal chamber 12, the inner edge of which communicates externally through an annular opening 13 defined between annular supports 3 and 4 and extending about axis 8, and which presents an inner surface 14 negatively reproducing the outer surface of finished tire 2.

Figure 1:
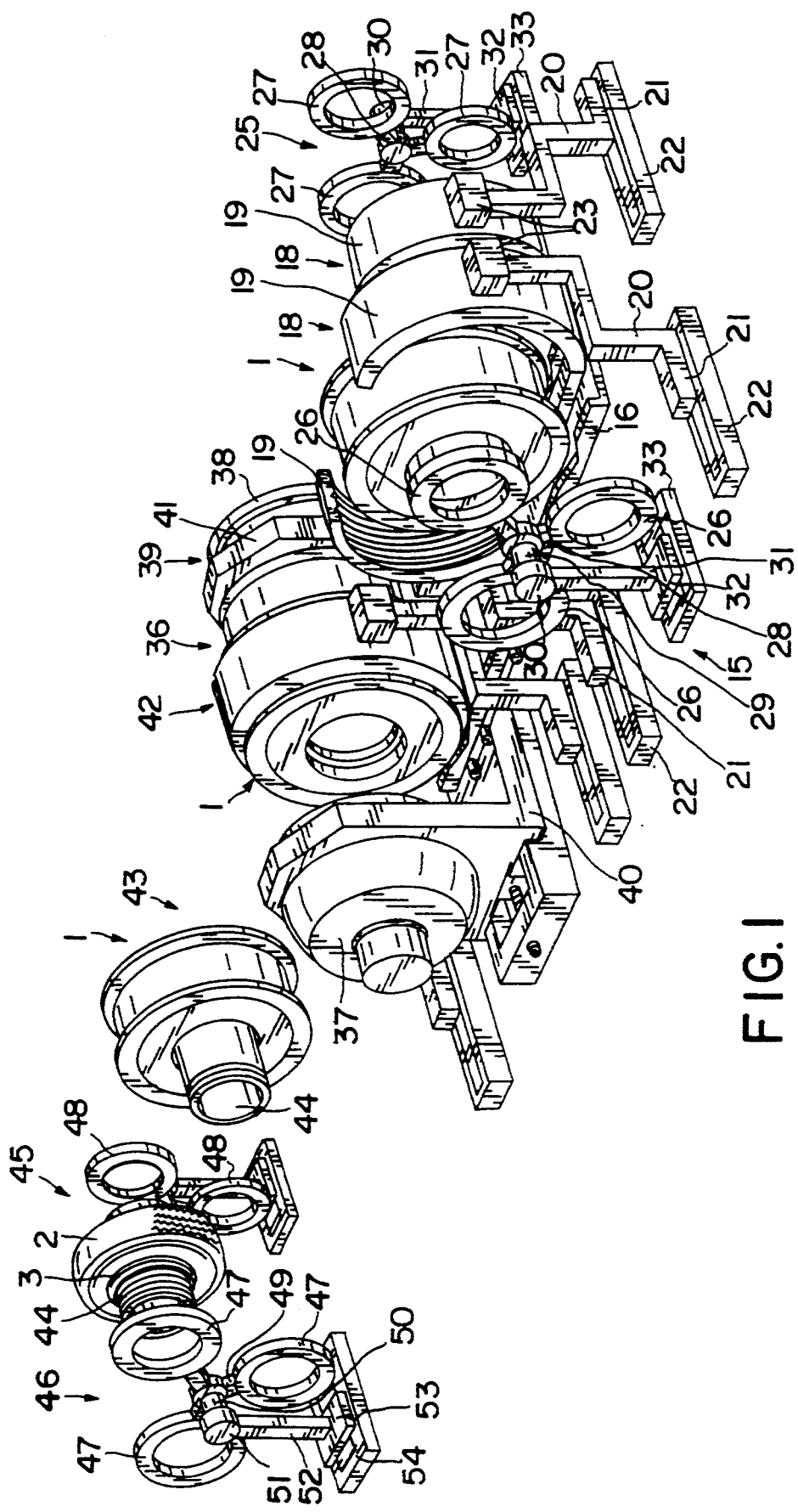
FIG. 1 shows a schematic view in perspective of a preferred embodiment of the method according to the present invention.

As shown in FIG. 1, once formed in a known manner inside toroidal chamber 12, green tire 2 is fed, together with forming mold 1, to a preheating station 15 into which mold 1 is rolled along a rail 16 (only part of which is shown), for which purpose, outer annular body 11 of mold 1 presents two outer annular flanges 17 for engaging rail 16.

Station 15 presents a number of outer peripheral annular heating element 18 of different sizes, each consisting of two half rings 19 supported on respective arms 20 extending upwards from respective powered slides 21 running along respective slideways 22, substantially perpendicular to rail 16. Each arm 20 is connected to respective half ring 19 via the interposition of a known actuator 23 for moving half ring 19 parallel to rail 16.

When mold 1 of a given size, i.e. for forming a given sized tire 2, is rolled into station 15 along rail 16, known linear actuators (not shown) activate slides 21 of the two half rings 19 of heating element 18, sized to mate perfectly with the outer surface 24 of mold 1. The two half rings 19 are positioned by respective slides 21 on either side of mold 1 standing in station 15, and respective actuators 23 are activated for moving half rings 19 into contact with surface 24.

Station 15 also presents a number of inner peripheral annular heating elements 25 of different sizes, each consisting of two annular heating bodies 26 and 27 located on either side of rail 16 and slightly larger in diameter than inner annular supports 3 and 4 of mold 1. Annular bodies 26 and 27 are all supported on respective appendixes 28 extending radially from respective coaxial shafts 29 substantially perpendicular to rail 16. Shafts 29 are connected to the output of and rotated by respective motors 30, each supported on a respective arm 31 extending upwards from a respective powered slide 32 running along a respective slideway 33 substantially perpendicular to rail 16.

When mold 1 of a given size, i.e. for forming a given sized tire 2, is rolled into station 15 along rail 16, motors 30 are operated for positioning two annular bodies 26 and 27 of the right size coaxial with mold 1. Known linear actuators (not shown) activate slides 32 for moving annular bodies 26 and 27 into contact with the outer surface 34 of respective annular plates 9 and 10, substantially at the bead portions 5 of tire 2 inside mold 1.

In other words, when mold 1 is arrested in station 15, heating elements 18 and 25 are connected respectively to outer annular body 11 and annular plates 9 and 10, and, when activated, provide for respectively preheating tread portion 35 and bead portions 5 of tire 2, i.e. the parts having a greater thermal inertia as compared with the rest of tire 2.

Upon tread portion 35 and bead portions 5 being preheated to the required temperature, heating elements 18 and 25 are removed, and mold 1 is rolled along rail 16 to curing station 36 and arrested coaxial with the two portions 37 and 38 of a known curing unit 39. Portions 37 and 38 are located on either side of rail 16 and supported on respective slides 40 and 41 by which they are brought together, in a direction substantially perpendicular to rail 16, so as to grip mold 1. The outer edge of mold 1 is enclosed, in station 36, by the two half rings of a further outer peripheral annular heating element 42 substantially identical to elements 18 already described.

Once tire 2 is cured, which is performed relatively rapidly by virtue of tread portion 35 and bead portions 5 being preheated in station 15, mold 1 is removed from curing unit 39 and fed to a parting station 43 where mold 1 and tire 2 are fitted through with a known tubular auxiliary support 44. Support 44 engages annular supports 3 and 4 in a fluidtight manner, and provides, in known manner not shown, for feeding compressed air inside tire 2.

Still in station 43, mold 1 is then parted by removing annular plates 9 and 10 followed by outer annular body 11.

Tire 2, still fitted to annular supports 3 and 4 and tubular support 44, is then fed to a postinflation station 45.

Station 45 presents a number of annular cooling elements 46 of different sizes, each consisting of two annular bodies 47 and 48 located on either side of tubular support 44 and slightly larger in diameter than inner annular supports 3 and 4 fitted to tire 2. Annular bodies 47 and 48 are all supported on respective appendixes 49 extending radially from respective coaxial shafts 50 connected to the output of and rotated by respective motors 51. Each motor 51 is supported on a respective arm 52 extending upwards from a respective powered slide 53 running along a respective slideway 54 parallel to respective shaft 50.

When a tire 2 of a given size arrives in station 45, motors 51 are operated for positioning two annular bodies 47 and 48 of the right size coaxial with tire 2. Known linear actuators (not shown) activate slides 53 for moving annular bodies 47 and 48 into contact with respective bead portions 5 of tire 2.

In other words, when tire 2 is arrested in station 45, cooling element 46 is connected to bead portions 5, and, when activated, provides for cooling bead portions 5 relatively rapidly to prevent the heat stored during curing by the metal beads (not shown) in bead portions 5, from overcuring the sidewalls of tire 2 at the postinflation stage.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A road vehicle tire manufacturing method comprising the steps of successively feeding a toroidal forming mold completely housing a finished green tire having a bead portion and a tread portion through a first preheating station wherein first heating means are connected to the forming mold for preheating only the bead portion and tread portion of the green tire; thus feeding said mold through a second curing station spaced apart from the first preheating station wherein the mold is connected to a curing unit pending completion of the curing process, and then feeding said mold through a third postinflation station spaced apart from the second curing station wherein the tire is engaged by means for cooling the bead portions of the tire.

2. A method as claimed in claim 1 wherein said first heating means comprises an outer peripheral annular heating element which is fitted to said forming mold for preheating a tread portion of said green tire; said outer annular heating element being selected from a number of similar outer annular heating elements of different sizes.

3. A method as claimed in claim 1 wherein said first heating means comprise a pair of inner peripheral annular heating elements which are fitted to said forming mold for preheating respective bead portions of said green tire; said pair of inner annular heating elements being selected from a number of pairs of similar inner annular heating elements of different sizes.

4. A method as claimed in claim 1 wherein the mold is parted and the tire removed from the mold prior to reaching said third station.

5. A method as claimed in claim 4 wherein prior to parting the mold, the mold and tire are engaged by a tubular support which provides for supporting the tire when the tire is removed from the mold and also when the tire is engaged by said cooling means at said third station.

6. A method as claimed in claim 1 wherein said cooling means comprises a pair of inner peripheral annular cooling elements which are fitted to the tire for cooling respective bead portions of the tire; said pair of inner annular cooling elements being selected from a number of pairs of similar inner annular cooling elements of different sizes.

* * * * *